United States Patent [19]

Mäkinen et al.

[11] Patent Number: 4,717,419
[45] Date of Patent: Jan. 5, 1988

[54] METHOD FOR TREATING IRON-BEARING SLAGS CONTAINING PRECIOUS METALS, PARTICULARLY SLAGS CREATED IN THE SMELTING PROCESS OF COPPER AND NICKEL

[75] Inventors: Juho K. Mäkinen, Vanha-Ulvila; Keith B. Murden, Espoo; Heikki P. Saari, Vanha-Ulvila, all of Finland

[73] Assignee: Outokumpu Oy, Helsinki, Finland

[21] Appl. No.: 888,102

[22] Filed: Jul. 18, 1986

Related U.S. Application Data

[63] Continuation of Ser. No. 755,958, Jul. 16, 1985, abandoned, which is a continuation of Ser. No. 471,292, Mar. 2, 1983, abandoned.

[30] Foreign Application Priority Data

Mar. 18, 1982 [FI] Finland .................................. 820941

[51] Int. Cl.⁴ .............................................. C22B 7/04
[52] U.S. Cl. ............................................. 75/24; 75/40; 75/72; 75/82; 75/84
[58] Field of Search ....................... 75/24, 40, 82, 84, 72

[56] References Cited

U.S. PATENT DOCUMENTS

| | | | |
|---|---|---|---|
| 3,506,435 | 4/1970 | Themelis et al. | 75/24 |
| 4,110,107 | 8/1978 | Paulson et al. | 75/72 |
| 4,304,596 | 12/1981 | Makipirtti et al. | 75/24 |
| 4,334,925 | 6/1982 | Kim et al. | 75/24 |
| 4,349,383 | 9/1982 | Chaudhuri | 75/24 |

FOREIGN PATENT DOCUMENTS

| | | | |
|---|---|---|---|
| 393336 | 12/1973 | U.S.S.R. | 75/24 |
| 48011 | 11/1980 | U.S.S.R. | 75/24 |
| 777074 | 11/1980 | U.S.S.R. | 75/24 |

Primary Examiner—Melvyn J. Andrews
Attorney, Agent, or Firm—Brooks Haidt Haffner & Delahunty

[57] ABSTRACT

The present invention relates to a method for treating iron-bearing slags containing precious metals, particularly slags created in copper and nickel smelting processes, by reducing the slag so that by means of adding a possible sulphidizing agent, the composition of the molten slag is regulated in solidified state to fall within the area where the metallicized, iron-bearing molten copper sulphide is in balance with the metallic copper and the iron-base metal alloy. By means of controlled cooling, the precious metals contained in this molten sulphide having an advantageous liquidus temperature are concentrated into the iron-base metal phase, whereafter the phase containing the precious metals can be separated by means of magnetic separation. After the magnetic separation, a selective hydrometallurgic treatment is carried out in order to recover the precious metals.

4 Claims, 4 Drawing Figures

METHOD FOR TREATING IRON-BEARING SLAGS CONTAINING PRECIOUS METALS, PARTICULARLY SLAGS CREATED IN THE SMELTING PROCESS OF COPPER AND NICKEL

This is a continuation of application Ser. No. 755,958, filed July 16, 1985, now abandoned, which is a continuation of application Ser. No. 471,292, filed Mar. 2, 1983, now abandoned.

The present invention relates to a method for treating iron-bearing slags containing precious metals, particularly slags created in the smelting processes of copper and nickel.

In pyrometallurgical copper processes, sulphide copper ore or copper concentrate is generally first smelted either in roasted or in unroasted form. During this first molten stage the oxidic gangue components and part of the iron contained in the basic material together form a slag phase, below which is separated the matte phase, whereinto copper is concentrated. The resulting matte which contains 30–75% copper is thereafter processed in a converter where iron and sulphur are oxidized.

Figure 1:
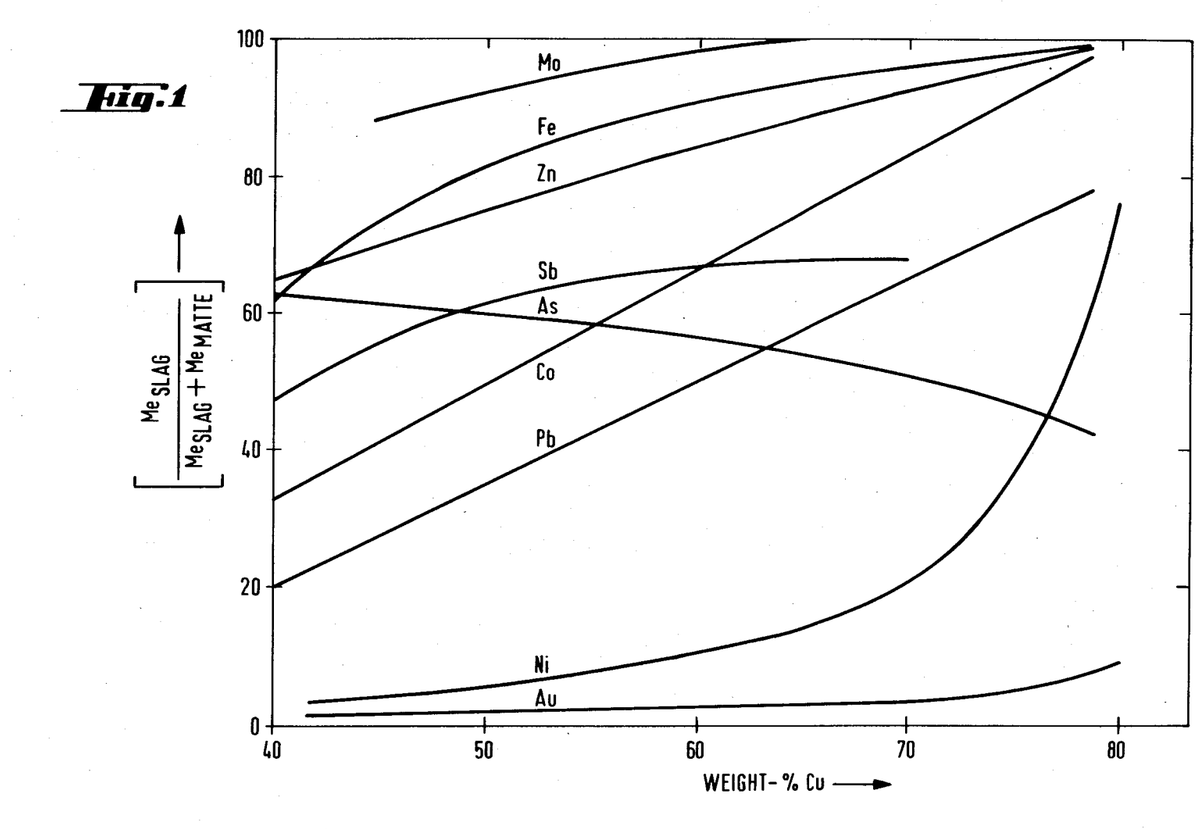
FIG. 1 illustrates the distribution of certain impurity metals between slag and matte, as the function of the copper content of the copper matte produced in a flash smelting furnace.

FIG. 1 illustrates the distribution of certain impurity metals between slag and matte, the distribution readings given as the function of the Cu-content of the matte produced in a flash smelting furnace. It is observed that even when producing such matte which is considerably poor in copper, the molybdenum is very selectively concentrated into the slag, whereas for example nickel and cobalt are mainly concentrated into the matte phase. During converting, the cobalt contained in the matte, as well as most of the nickel, are oxidized and transferred into the slag. Consequently, it is profitable to recover molybdenum from the smelting stage slags of ore or concentrates, whereas converter slags are better suited for the recovery of cobalt and nickel. A similar type of scrutiny can be applied to the treatment of Ni—(Cu—) concentrates.

It is most sensible to separate the precious metals in question from the said slags by reducing the slag at a high temperature and by collecting the valuable metals into a metallic and/or sulphidic phase, which is in contact with the slag and is created from the slag either by reducing or by means of suitable additives. A direct hydrometallurgical or concentration treatment of the slag is not successful, because the said valuable metals within the slag are bound to silicates, ferrites and other such compounds which are difficult to process.

In a prior art method concerning the recovery of cobalt and copper from copper converter slags (R. M. Whyte et al., IMM, London 1977, pp. 57–68), the slag is carbothermically reduced in order to produce an iron-cobalt-copper alloy which is suitable for hydrometallurgical treatment. The drawback of the method is the high melting temperature (1350°–1450° C.) of the created bottom metal, which requires that the temperature in the reduction furnace should be 1500°–1550° C. Thus the fayalite slag is 300°–350° C. above its melting temperature, which leads to high wear of the furnace lining. By using suitable additives, the melting temperature of the slag can be increased, but even then there are problems, among others the concentration of silicon into metal, which causes great difficulties in the hydrometallurgical treatment of the metal. Moreover, the created metal alloy has to be granulated, because it is extremely difficult to grind such metal which has been cooled in casting state.

The temperature of the reduction process can be lowered by lowering the melting temperature of the resulting bottom metal by means of sulphide additions. The FI-Pat. No. 21130 introduces a method for reducing such slag which contains precious metals and is obtained through copper smelting or other metallurgical processes, the reduction taking place by means of iron sulphide (Fe/S>1) or iron, the end product being copper matte, possibly partially metallized copper matte. The temperature range is 1200°–1300° C., and the reaction speed is increased by agitation. The reductant can be added in several stages, and the resulting copper matte can be removed after each stage. The method does not, however, aim at recovering precious metals—mainly Ni and Co, but also Cu—into various products by means of regulating the composition of the metallicized sulphide matte, neither by means of slow cooling nor phase separation of the metallicized sulphide matte.

The DE-Pat. No. 1 558 425 introduces a method where copper is continuously leached from molten iron silicate slag by keeping the slag in contact with molten sulphide material. One single batch of molten iron sulphide or molten copper sulphide or molten copper matte is used for treating several slag compounds, until the copper content of the molten sulphide material is close to such copper content which is in balance with the slag. As the basic sulphidizing material can be used for example the melting product of pyrite, and pyrite can also be added during the treatment. The processing time can be shortened by means of intensifying the agitation by blowing air or an inert gas or an oxidizing gas into the molten material. In this method the matte is in completely sulphidic form, and the operation temperature is roughly 1230° C. In the method the sulphide matte is never in metallicized state, neither does the said method aim at recovering precious metals—mainly Ni and Co, but also Cu—into various products by means of the metallicized sulphide matte, nor by means of slow cooling and phase separation.

The employment of sulphide additions in order to decrease the temperature of the bottom metal created in the smelting processes of copper and nickel is also known from the CA-Pat. No. 998 246, the U.S. Pat. No. 2,438,911 and from the SU-Pat. No. 393 336.

The U.S. Pat. No. 3,314,783 introduces a method where molybdenum-bearing slags, mostly copper smelting slags, are reduced in such conditions that the molybdenum is concentrated into the metallic reduction product. The cooled reduction product is dissolved into acid so that the molybdenum remains in the solution residue. During the reduction stage, it is possible to feed pyrite into the furnace in order to embrittle the reduction product. The operation temperature in the reduction furnace is 1275°–1400° C.

In a method according to the U.S. Pat. No. 3,857,699, which is an improvement to the aforementioned U.S. patent, molybdenum-bearing slags—mainly copper smelting slags—are put through a leaching process, where into the slag is stirred molten, immiscible metal sulphide which contains iron and sulphur in a molar ratio of 9:1–2:1, the temperature ranging between the slag melting point and 1600° C. The slag treatment product is separated from the slag and roasted. The molybdenum is dissolved from the roasted product and thereafter recovered. The leaching into iron sulphide can be carried out in several stages in countercurrent direction. A recommendable ratio Fe:S is 3:1–2:1, when the system temperature is maintained in the area 1200°–1375° C. The process is meant to be applied mainly to reverberatory smelting slags of copper concentrates, but can also be applied to copper converter slags. According to the U.S. Pat. No. 3,857,699, it is profitable to eliminate copper from converter slags by means of the method introduced in the U.S. Pat. No. 3,857,700, before the molybdenum is leached from iron matte.

According to the method introduced in the FI-Pat. No. 56398, the smelter slags are reduced, in order to separate precious metals, into metallicized, iron-base molten sulphide material. In this case, during the smelting of sulphidic or metallic intermediate products, it is necessary to control the iron and sulphur contents of the molten material by means of scrap iron-iron sulphide additions or element sulphur additions in order to obtain the exact molten sulphide composition required by the method. The metallicized sulphide matte is, by means of controlled cooling, crystallized into an iron-base metal phase, whereinto are concentrated—more or less completely—the following elements: Ni, Co, Ga, Ge, Mo, W, Sn, Re, Au, Pt, etc. The sulphide phase, which is normally rich in copper, is separated from the metal phase by means of magnetic separation, leaching of the metal phase or other such well known method. The reduction is preferably carried out in the temperature 1200°–1400° C., and the cooling of the metallicized molten sulphide material is slowed down during the temperature range 1000°–500° C.

In the specification of the aforementioned FI-Patent, among others the following values of the distribution coefficient L between the metal alloy and the sulphide alloy are given as functions of the temperature obtained during balance annealing (time delay 2–5 h) of metallicized sulphide alloys which are rich in nickel (20–30% Ni, 0–6% Cu and 20–30% S):

$$L_{Ni} = 260 \times 10^3 / T - 176 \quad (1)$$

$$L_{Co} = 170 \times 10^3 / T - 115 \quad (2)$$

$$L_{Cu}^{-1} = 2.15 \times 10^3 / T - 5.79 + 0.297 |\%S| \quad (3)$$

It is observed that while the temperature decreases, the distribution coefficient of nickel and cobalt grows considerably, whereas with copper the temperature effect is very slight and negative. The sulphur content of the metallicized sulphide alloy in turn influences the copper distribution coefficient so that the coefficient diminishes while the sulphur content grows.

In free cooling, among others the following distribution coefficient values are obtained for alloys which are rich in copper and nickel (i.e. slag reduction products):

$$L_{Ni} = -4.58 + 0.249 |\%Fe|; \ 12\%S \quad (4)$$

$$L_{Ni} = -10.22 + 0.428 |\%Fe|; \ 16\%S \quad (5)$$

$$L_{Co} = -4.21 + 0.274 |\%Fe|; \ 12\%S \quad (6)$$

$$L_{Co} = +0.09 + 0.138 |\%Fe|; \ 16\%S \quad (7)$$

$$10^2 L_{Cu} = 25.50 - 0.1732 |\%Fe|; \ 12-16\%S \quad (8)$$

It is observed that while the iron-content of a metallicized sulphide alloy increases, the values of the distribution coefficients of both nickel and cobalt also increase, whereas the distribution coefficient of copper diminishes.

As an overall example, the following values can be enlisted as regards the distribution coefficients of other elements in similar conditions:
Mo 6–20, Ga 30–50, Ge 10–20, Ag 0.06–0.40, W 13–20, Re 6–10, Au 8–14, Pt 10–20, Pd 5–10.

The purpose of the present invention is to achieve a new, superior method for recovering precious metals from iron-bearing slags by means of reduction and by employing, when necessary, sulphide addition in order to lower the melting temperature of the created bottom metal.

According to the present invention, the iron-bearing slags created in nickel and copper smelting processes are reduced into metallicized matte in order to extract the precious metals contained by the said slags, the main metallic component of the said matte being copper. Thus the liquidus temperature of the metallicized molten sulphide material, in which temperature the solidification of the molten material starts, is essentially lower than the liquidus temperature of the iron-base molten sulphide material described in the FI-Pat. No. 56938, which causes a considerable decrease both in the operation temperature of the smelting process and the operation costs, for example as regards the linings of the smelting furnace. Moreover, the valuable metals, such as cobalt and nickel, are removed from the slag more effectively than before.

According to the invention, the reduction is carried out while the sulphide matte created in the reduction process has a temperature between 1100°–1400° C., preferably 1200°–1300° C., so that first the magnetite content of the processed slag is diminished, for example by means of coke reduction, to be less than 10% by weight, whereafter the slag is reduced by sulphidization, where into the molten substance is added a sulphidizing medium containing copper and/or iron. Now the metallicized sulphide matte, which is created from the slag, is by means of a sulphidizing medium manipulated to have such a composition that the said metallicized sulphide matte achieves, by means of controlled cooling in a stationary space, such a structure where the iron-bearing copper sulphide phase is in balance with the metallic copper and the iron-base metal alloy. By means of controlled cooling within the temperature range 1000°–500° C., the metallicized sulphide matte becomes easily grindable, which is profitable also from the point of view of further processing. The crushed and ground, metallicized sulphide matte is further carried through magnetic separation, whereafter the magnetic fraction receives a selective hydrometallurgical treatment in order to separate the precious metals.

In the following the invention is explained with reference to the appended drawings, where.

FIG. 1 has already been dealt with in connection with the prior art.

Figure 2:
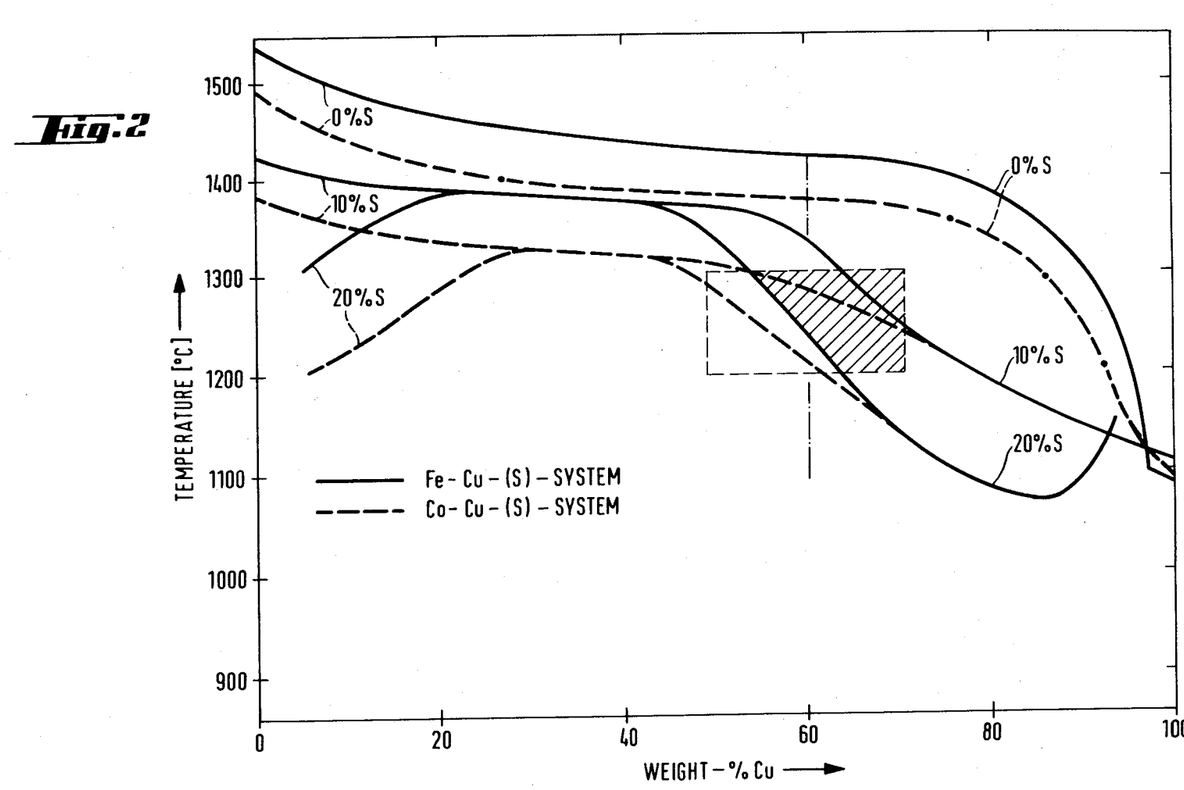
FIG. 2 illustrates the dependence of the liquidus temperatures of the systems Fe-Cu and Co-Cu on the copper content of the alloy, and the influence of sulphur addition on the said liquidus temperature.

FIG. 2 is a schematic illustration of the dependence of the liquidus temperatures of the systems Fe-Cu and Co-Cu on the copper content of the alloy, and of the influence of sulphur addition on the said temperature. It is observed that without sulphur addition, the liquidus temperature of Fe-Cu alloys surpasses 1400° C. already with a 20% iron content. In a pure Co-Cu system the liquidus temperature runs roughly 30°–50° C. lower. If the complete miscibility of the Fe-Co system is taken into account, it can be estimated that the liquidus temperature of the Fe-Co-Cu system runs somewhere between these two curves.

A 10% sulphur addition into the said systems decreases the liquidus temperature 50°–100° C. with low-copper (less than 50% Cu) alloys and 70°–200° C. with high-copper (50–90% Cu) alloys. For example, with a copper content of 70%, the liquidus temperature of the system Fe-Cu+10% S is only 1240° C., whereas it is 1370° C. with a copper content of 50%.

By adding 20% sulphur to the Fe-Cu or Co-Cu systems, the liquidus temperatures are further decreased, although in the content range 20–40% Cu the increase of the sulphur addition from 10% to 20% does not yet have any remarkable effect. A comparison in the above manner proves that with a copper content of 70% the liquidus temperature of the Fe-Cu+20% S system is only 1130° C., and with a copper content of 50% the temperature is 1340° C.—in other words, the 20% increase of the copper content decreases the liquidus temperature as much as 210° C.

While cleaning iron silicate slags in an electric furnace, the temperature of the slag must not surpass 1400° C., if excessive wearing of the furnace linings should be avoided. The temperature of the matte or of the bottom metal is generally 50°–100° C. lower than the slag temperature. The optimum liquidus temperature range of the matte can be regarded as 1200°–1300° C. In FIG. 2 the said temperature range (marked as a rectangle) is limited to the Cu-content 50–70%. In addition to this, inside the said rectangle is marked a hatched space, which remains above the liquidus temperature of the Fe-Cu+20% S system. This space is further increased, if iron is substituted by cobalt.

A similar survey can also be performed with the Fe-Mo-Cu-S system, although it is pointed out that in practice the discovered Mo-contents are very small, because solid iron dissolves molybdenum only in a considerably small degree (700° C.: 7% by weight Mo), and metallic copper does not dissolve it at all. The excess molybdenum is precipitated either in metallic or—with higher sulphur contents—in sulphidic form. The separation of these from sulphidic phases is not possible magnetically, but in some cases flotation or leaching can be considered.

As regards the system Ni-Cu-S, the aforementioned survey is not valid, because nickel itself tends to lower the melting temperatures of the said mattes.

In the method according to the FI-Pat. No. 56398, the slags are reduced in such circumstances, and by adding sulphur and/or iron when necessary, that the composition of the molten material in a solid state matches the balance of bornite-pyrrhotite, as well as it matches such an amount of the metal phase that the formation of Ni and Co pentlandite is prevented. In the method of the present invention, however, a significant amount of the copper is in metallic, solid state.

Figure 3:
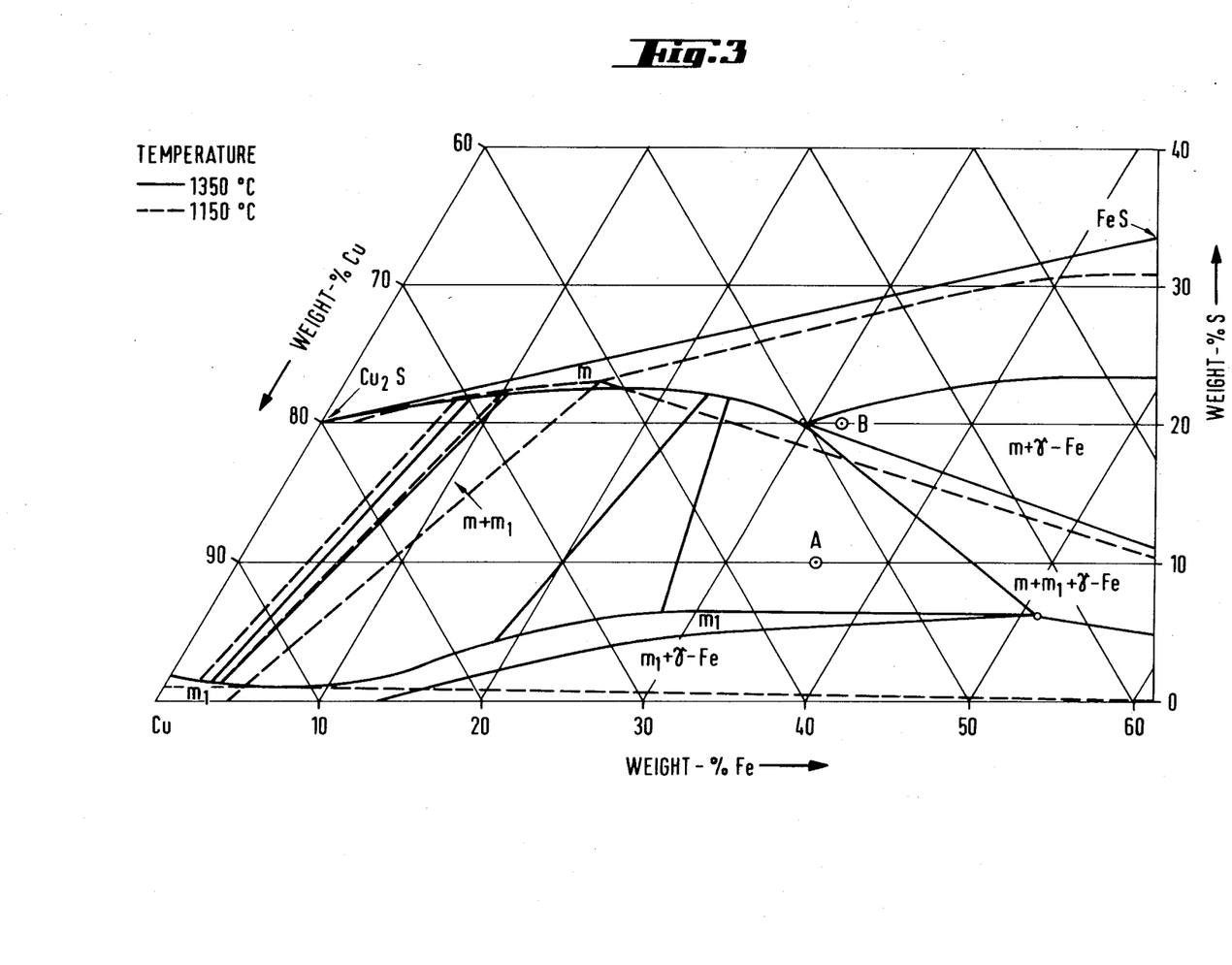
FIG. 3 illustrates the phase areas and the miscibility gap in the system Cu-Fe-S in temperatures 1350° C. and 1150° C.

FIG. 3 illustrates the phase areas and the miscibility gap in the system Cu-Fe-S with the temperatures 1350° C. and 1150° C. As the object of the scrutiny is now chosen a metal alloy with 60% Cu and 40% Fe. When 10% sulphur is added into this alloy, the point A in the diagram is reached, and a 20% sulphur addition leads to the point B.

In the temperature 1350° C. the point A falls within the molten miscibility gap, where the compositions at the terminal points of the tie-line running through A are about: 52% Cu, 27% Fe, 21% S and 54,5% Cu, 39% Fe and 6,5% S. When the alloy A is cooled to 1150° C., an area of three different phases is reached, where the molten sulphide material (m) is in balance with the molten, copper-base metal phase ($m_1$) and with the solid $\gamma$ iron. As the temperature is further decreased, both the molten sulphide and the copper-base phase are solidified, and the $\gamma$ phase is transformed into $\alpha$ iron. In the temperature 700° C., only 0.35% Fe and 0,001% S is dissolved along with the copper phase, and 1.25% Cu and about 0.01% S along with the iron phase. It is clear that so small impurity contents do not influence the magnetic properties of the $\alpha$ iron.

In the temperature 1350° C. the point B falls within the area of two different phases, where the solid $\gamma$ iron, containing about 10% Cu and some sulphur, is in balance with the molten sulphide phase, the composition whereof is roughly: 49% Cu, 30.5% Fe and 20.5% S. While the temperature decreases to 1150° C., it still remains within the area of two phases. Now the Fe content of the molten sulphide has decreased below 20%, whreas its copper content has increased to 57–58%.

While the temperature decreases further, the molten sulphide solidifies and the pyrrhotite phase $Fe_{1-x}S$ starts to precipitate therefrom. Finally the bornite-pyrrhotite balance, mentioned in the FI-Pat. No. 56398, is reached.

Figure 4:
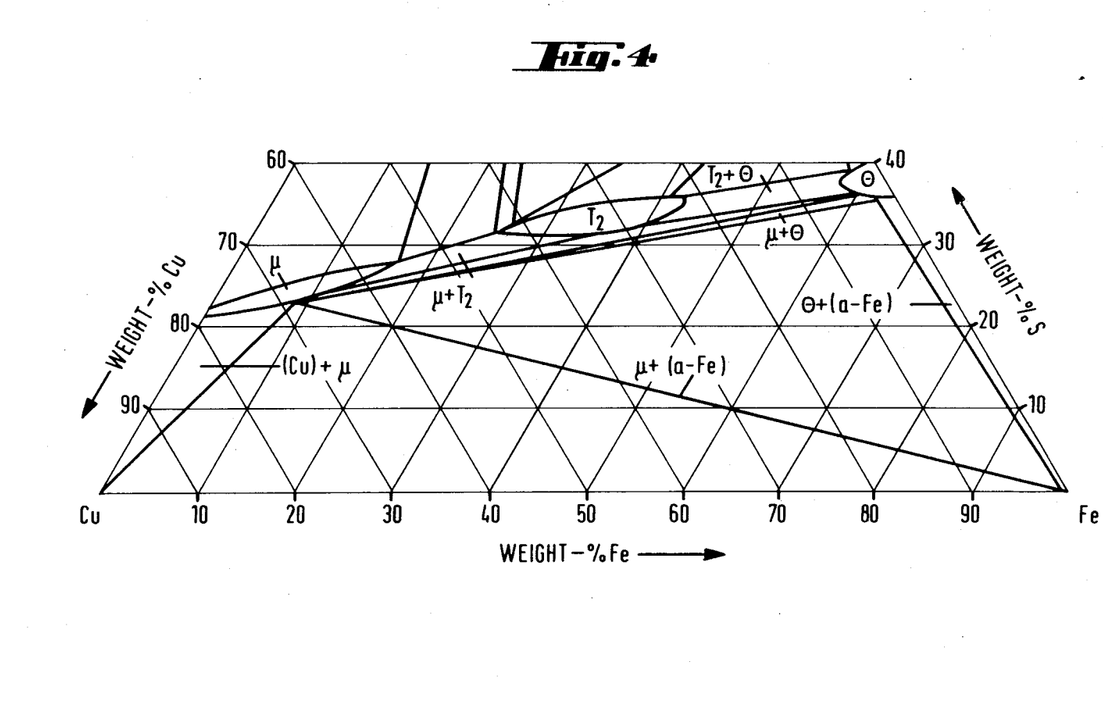
FIG. 4 illustrates the phase areas of the system Cu-Fe-S in the temperature 600° C.

In FIG. 4 it can be seen that instead of $Fe_{1-x}S$ ($\theta$), metallic copper starts to precipitate from the sulphide, if the Cu/S ratio in the system is more than 3—in other words, if the composition is located within the area of three phases (Cu)+$\mu$+($\alpha$-Fe), where (Cu) is a solid metal copper, $\mu$ is a solid bornite phase and ($\alpha$-Fe) is a solid metallic iron. In order to illustrate the different phases, also the solid chalcopyrite phase $T_2$ is marked in FIG. 4. It is also apparent from FIG. 4, that metallic iron is present whenever the S/Fe ratio in the system is less than 2.7, while the sulphur content lies between 6.5–23%, preferably between 10–20% by weight.

The influence of the disappearing of the pyrite phase and the apparition of the (Cu) phase on the distribution of precious metals in various phases is examined on the basis of the values given in Table 1. There can be seen the solubility of nickel, cobalt and molybdenum into a $\alpha$ and $\gamma$ iron, into metallic copper and pyrrhotite, which is in balance with metallic $\alpha$ iron in the temperature 700° C.

TABLE 1

The solubility of some metals into $\alpha$ and $\gamma$ iron, copper and pyrrhotite in the temperature of 700° C.

| Phase | Element (% by weight) | | |
|---|---|---|---|
| | Ni | Co | Mo |
| $\alpha$-iron | 2.5 | 75 | 7 |
| $\gamma$-iron | 100 | — | — |
| copper | 100 | 1.0 | 0 |
| $Fe_{1-x}S$ in balance | 1.0 | 2.5 | 2 |

TABLE 1-continued

The solubility of some metals into α and γ iron, copper and pyrrhotite in the temperature of 700° C.

| Phase | Element (% by weight) | | |
|---|---|---|---|
| | Ni | Co | Mo |
| with α-Fe | | | |

From Table 1 it can be seen, that the disappearing of pyrrhotite and the precipitation of metallic copper no doubt improves the recovery of cobalt and molybdenum into the iron phase. On the other hand it is apparent that the recovery of nickel—the price whereof is about 10% of the price of cobalt and molybdenum according to the 1980 price level—into the iron phase may decrease. In practice, however, a correctly performed cooling may lead to a balance where the distribution coefficients of nickel, cobalt and molybdenum between the iron and copper phases are $L_{Ni}^{Fe-Cu}=20$, $L_{Co}^{Fe-Cu}=80$ and $L_{Mo}^{Fe-Cu}=100$. Among these, the distribution coefficients of cobalt and molybdenum are clearly higher than those of the iron-$Fe_{1-x}$ balance.

The operation principle and some advantageous applications of the present invention are described in the examples 3-5. In the examples 1 and 2 are described a prior art slag reduction method without sulphidization (example 1) and a reduction method for forming iron-based matte, as in the FI-Pat. No. 56398 (example 2), both examples using similar slag and similar equipment as in example 3, where the method of the present invention is applied in order to create metallicized copper sulphide matte.

According to the invention, the reduction of iron-bearing slags containing precious metals—particularly slags created in copper and nickel smelting processes—in order to create such metallicized matte, the main component whereof is copper, was carried out in an electric furnace provided with three graphite electrodes and having a nominal output of 500 kVA. The size of the slag batch was 1000 kg, and it was fed into the reduction furnace in molten state. The sulphidizing medium was fed into the slag, either by injecting or by pouring it down in solid or molten state. In order to diminish the sulphur losses, the sulphidizing medium was fed into the electric furnace only after the magnetite-$Fe_3O_4$-content of the slag was reduced to below 10% by weight of the amount of slag. The total amount of the reductant coke was 5% by weight of the amount of slag, and the final $Fe_3O_4$-content of the reduced slag was 1-3% by weight of the reduced product.

The reduced product from the electric furnace was transferred into a pot, where it was cooled in a controlled fashion under a thin layer of coke. The cooling rate was slowed down in the temperature range 1000°-500° C. so that the cooling time was stretched to several hours. By means of the layer of coke, the formation of iron oxide and ferrites is prevented during the slow cooling, which improves solubility during the phase separation following the treatment.

The phase separation was carried out by means of a magnetic separator, the strength of the magnetic field whereof could be regulated between 150-1000 Gauss. The magnetic fraction thus created is suitable for hydrometallurgical treatment in order to selectively separate precious metals, whereas the non-magnetic fraction is returned back to smelting.

EXAMPLE 1

According to Example 1, the converter slag reduction in a production-scale copper smelter was carried out without adding any sulphidizing medium. The treated slags contained 5.3% Cu, 2.6% Co, 1.8% S and 25% $Fe_3O_4$ (percentages by weight). In the reduction the slag temperature was 1500° C., and the reduction time was 2 h. The analysis of the produced metal in percentages by weight was (Table 2): 13.1% Co, 26.1% Cu, 57.6% Fe and 3.2% S.

In FIG. 2 it is observed that the melting point of the created metal alloy is over 1400° C.; consequently, because the temperature of the slag and the matte/metal in the reduction furnace is generally 50°-100° C., part of the metal alloy is solidified in the furnace leaving behind a Cu-rich molten sulphide material. The crushing and grinding of such metal is in practice impossible, wherefore neither slow cooling nor phase separation could be considered.

In order to compeletely avoid the selective freezing, this slag should be reduced in a temperature of roughly 1550° C. This starts the reducing process of silicate oxide $SiO_2$, which makes any further hydrometallurgical treatment of the metal very difficult and causes a disastrous wearing in the furnace linings.

EXAMPLE 2

The reduction of the Co-rich converter slag, as in Example 1, was carried out by adding pyrite as a sulphidizing medium in order to form an iron-base molten sulphide material according to prior art methods. The reduction took place in the temperature 1450° C. According to Table 3, the analysis of the produced sulphide matte in percentages by weight was: 11.1% Co, 16.9% Cu, 52.8% Fe and 16.6% S.

According to FIG. 2, the liquidus temperature of the obtained iron-base molten sulphide material was over 1350° C. Thus from the matte was precipitated an iron-base metal phase with a high melting temperature, which metal phase had a concentration of cobalt.

After tapping the slag, the obtained iron-base matte had to be heated in order to eliminate possible accretions, whereafter the matte was put through controlled cooling, crushing, grinding and magnetic separation according to the FI-Pat. No. 56398. In Table 3a it can be seen that the magnetic fraction of the magnetic separation contained 20.8% by weight Co, wherefore it was suited for further hydrometallurgical treatment. The nonmagnetic fraction contained 27.6% by weight Cu, and it can be processed in a copper smelter, so that the cobalt contained therein will again end up in the converter slag.

EXAMPLE 3

The high-grade cobalt converter slag mentioned in examples 1 and 2 was reduced, according to the present invention, in the temperature 1400° C., and as the sulphidizing medium was used molten copper matte (60% by weight Cu). Table 4 illustrates the analysis of the produced sulphide matte in percentages by weight: 6.8% Co, 49.2% Cu, 28.4% Fe and 13.8% S.

According to FIG. 2, the liquidus temperature of the produced metallicized copper sulphide matte was below 1300° C. Thus selective cooling did not take place. By comparing Tables 3 and 4 it can be observed, that the recovery of sulphur into the matte was about 88%, whereas it was only about 50% when pyrite was used as the sulphidizing medium (example 2).

The produced matte was cooled in a controlled manner and crushed and ground, whereafter magnetic separation took place. According to Table 4a, the magnetic fraction has a very similar composition to the magnetic fraction of Example 2, whereas the non-magnetic fraction contains as much as 67.9% by weight copper, which is advantageous as regards further smelting of the fraction.

EXAMPLE 4

Cobalt- and nickel-bearing converter slag was reduced according to the new method in the temperature 1350° C. by employing copper concentrate (26% by weight Cu) as the sulphidizing medium. In Table 5, which illustrates the material balance for the magnetic separation of the metallicized copper sulphide matte produced according to the example, it can be seen that the analysis of the produced sulphide matte in percentages by weight was the following: 2.79% Co, 4.13% Ni, 43.6% Cu, 32.0% Fe and 15.3% S.

According to FIG. 1, the liquidus temperature of the produced metallicized copper sulphide matte was below 1300° C. In reality the liquidus temperature was even lower than this, owing to the nickel dissolved in the matte. Because of the low liquidus temperature, there were no accretions created in the furnace. In Table 5 it can be seen that the recovery of sulphur into the molten material was 71%.

In Table 5a, which illustrates the material balance for the magnetic separation of the metallicized copper sulphide matte produced according to the example, it can be observed that the magnetic fraction contains 8.23% by weight Co and 12.4% by weight Ni, and that the nonmagnetic fraction contains 73.0% by weight Cu.

EXAMPLE 5

By employing the method of the present invention, the reduction of molybdenum-bearing reverbatory smelting furnace slag, received from a production-scale smelter which processes porphyric copper concentrates, was carried out by employing molten copper matte (46.8% Cu) from the said reverbatory smelting furnace as the sulphidizing agent. The slag to be reduced contained in percentages by weight 0.38% Mo, 0.55% Cu, 0.10% S and 11.2% $Fe_3O_4$. The reduction took place in the slag temperature 1350° C. Tables 6 and 6a illustrate the material balance for the reduction and magnetic fraction according to the example. The analysis of the produced sulphide matte (Table 6) in percentages by weight was the following: 1.83% Mo, 48.4% Cu, 31.7% Fe and 16.1% S.

According to FIG. 2, a liquidus temperature of about 1250° C. was obtained. There were no harmful metal accretions created inside the furnace. In this example, 81% of the sulphur of the added sulphidizing agent was recovered into the molten material.

In the magnetic separation (Table 6a) the recovery rate of molybdenum into the magnetic fraction was about 88%, while the molybdenum content was 6.5% by weight.

TABLE 2

Reduction of Co-rich Cu converter slag without sulphidization

| | Amount kg | Co %/kg | Cu %/kg | Fe %/kg | S %/kg | $SiO_2$ %/kg | $Al_2O_3$ %/kg | CaO %/kg | $Fe_3O_4$ %/kg |
|---|---|---|---|---|---|---|---|---|---|
| In: | | | | | | | | | |
| Converter slag % | | 2.6 | 5.3 | 44.0 | 1.8 | 23.3 | 3.4 | 0.71 | 25.0 |
| Converter slag kg | 1000 | 26.0 | 53.0 | 440.0 | 18.0 | 233.0 | 34.0 | 7.10 | 250.0 |
| Coke kg | 50 | | | | | | | | |
| Total kg | 1050 | | | | | | | | |
| Out: | | | | | | | | | |
| Metal alloy % | | 12.9 | 26.9 | 54.3 | 3.9 | | | | |
| Metal alloy kg | 186.9 | 24.11 | 50.28 | 101.5 | 7.29 | | | | |
| Slag % | | 0.26 | 0.39 | 47.4 | 0.95 | 32.6 | | | 0.26 |
| Slag kg | 713.5 | 1.86 | 2.78 | 338.20 | 6.78 | 232.6 | | | 1.86 |
| Total kg | 938.4 | 25.97 | 53.06 | 439.69 | 12.76 | 232.6 | | | |
| Distributions: | | | | | | | | | |
| Metal | 19.92 | 92.84 | 94.76 | 23.08 | 40.50 | | | | |
| Slag | 80.08 | 7.16 | 5.24 | 76.92 | 37.67 | | | | |

TABLE 3

Reduction of Co-rich Cu converter slag and sulphidization of resulting matte with pyrite

| | Amount kg | Co %, kg | Cu %, kg | Fe %, kg | S %, kg | $SiO_2$ %, kg | $Al_2O_3$ %, kg | CaO %, kg | $Fe_2O_4$ %, kg |
|---|---|---|---|---|---|---|---|---|---|
| In: | | | | | | | | | |
| Converter slag % | | 2.6 | 3.8 | 44.2 | 1.2 | 23.6 | 2.9 | 2.3 | 22.8 |
| Converter kg | 1000 | 26.0 | 38.0 | 442.0 | 12.0 | 236.0 | 29.0 | 23.0 | 228.0 |
| Pyrite % | | — | 0.07 | 45.0 | 50.4 | 2.0 | | | |
| Pyrite kg | 150 | — | 0.1 | 67.5 | 75.6 | 3.0 | | | |
| Coke kg | 50 | | | | | | | | |
| Total kg | 1200 | 26.0 | 38.1 | 509.5 | 87.6 | 239.0 | | | |
| Out: | | | | | | | | | |
| Matte % | | 11.1 | 16.9 | 52.8 | 16.6 | | | | |
| Matte kg | 212.2 | 23.55 | 35.86 | 112.0 | 35.23 | | | | |
| Slag % | | 0.30 | 0.28 | 48.4 | 1.10 | 29.1 | | | 2.32 |
| Slag kg | 821.0 | 2.46 | 2.30 | 397.4 | 9.03 | 238.9 | | | 19.00 |
| Total kg | 1033.2 | 26.01 | 38.16 | 509.4 | 44.26 | 238.9 | | | |
| Distributions: | | | | | | | | | |
| Matte % | 20.54 | 90.54 | 93.97 | 21.99 | 40.22 | | | | |

TABLE 3-continued

Reduction of Co-rich Cu converter slag and sulphidization of resulting matte with pyrite

| | Amount kg | Co %, kg | Cu %, kg | Fe %, kg | S %, kg | SiO$_2$ %, kg | Al$_2$O$_3$ %, kg | CaO %, kg | Fe$_2$O$_4$ %, kg |
|---|---|---|---|---|---|---|---|---|---|
| Slag % | | 79.46 | 9.46 | 6.03 | 78.01 | 10.31 | | | |

TABLE 3a

Magnetic separation of the slowly cooled sulphide matte created in Example 2

| | Amount kg | Co %, kg | Cu %, kg | Fe %, kg | S %, kg |
|---|---|---|---|---|---|
| In: | | | | | |
| Ground matte % | | 11.1 | 16.9 | 52.8 | 16.6 |
| Ground matte kg | 212.1 | 23.55 | 35.86 | 112.0 | 35.23 |
| Out: | | | | | |
| Magnetic fraction % | | 20.8 | 7.2 | 61.2 | 8.8 |
| Magnetic fraction kg | 111.4 | 23.17 | 8.02 | 68.2 | 9.80 |
| Non-magnetic fraction % | | 0.38 | 27.6 | 43.5 | 25.2 |
| Non-magnetic fraction kg | 100.8 | 0.38 | 27.82 | 43.8 | 25.40 |
| Total kg | 212.2 | 23.55 | 35.84 | 112.0 | 35.20 |
| Distributions: | | | | | |
| Magnetic fraction % | 52.5 | 98.39 | 22.38 | 60.89 | 27.84 |
| Non-magnetic fraction kg | 47.5 | 1.61 | 77.62 | 39.11 | 72.16 |

TABLE 4a

Magnetic separation of the slowly cooled sulphide matte created in Example 3

| | Amount kg | Co %, kg | Cu %, kg | Fe %, kg | S %, kg |
|---|---|---|---|---|---|
| In: | | | | | |
| Ground matte % | | 6.8 | 49.2 | 28.4 | 13.8 |
| Ground matte kg | 332.5 | 22.61 | 163.6 | 94.4 | 44.9 |
| Out: | | | | | |
| Magnetic fraction % | | 18.7 | 15.2 | 54.3 | 8.7 |
| Magnetic fraction kg | 118.04 | 22.07 | 17.9 | 64.1 | 10.3 |
| Non-magnetic fraction % | | 0.25 | 67.9 | 14.1 | 16.1 |
| Non-magnetic fraction kg | 214.46 | 0.54 | 145.6 | 30.2 | 34.5 |
| Total kg | 332.5 | 22.61 | 163.5 | 94.3 | 44.8 |
| Distributions: | | | | | |
| Magnetic fraction % | 35.5 | 97.61 | 10.95 | 68.0 | 23.2 |
| Non-magnetic fraction % | 64.5 | 2.39 | 89.05 | 32.0 | 76.8 |

TABLE 4

Reduction of Co-rich Cu converter slag and sulphidization of the resulting matte with Cu-matte

| | Amount kg | Co %, kg | Cu %, kg | Fe %, kg | S %, kg | SiO$_2$ %, kg | Al$_2$O$_3$ %, kg | CaO %, kg | Fe$_3$O$_4$ %, kg |
|---|---|---|---|---|---|---|---|---|---|
| In: | | | | | | | | | |
| Converter slag % | | 2.4 | 4.8 | 44.8 | 1.4 | 25.0 | 3.5 | 2.1 | 24.2 |
| Converter slag kg | 1000 | 24.0 | 48.0 | 448.0 | 14.0 | 250.0 | 35.0 | 21.0 | 242.0 |
| Matte % | | 0.36 | 59.9 | 14.6 | 22.4 | | | | |
| Matte kg | 200 | 0.72 | 119.8 | 29.2 | 44.8 | | | | |
| Coke kg | 50 | | | | | | | | |
| Total kg | 1250 | 24.72 | 167.8 | 477.2 | 58.8 | | | | |
| Out: | | | | | | | | | |
| Matte % | | 6.8 | 49.2 | 28.4 | 13.8 | | | | |
| Matte kg | 332.5 | 22.61 | 163.6 | 94.4 | 44.9 | | | | |
| Slag % | | 0.26 | 0.51 | 47.4 | 0.85 | 30.9 | | | 1.66 |
| Slag kg | 807.9 | 2.10 | 4.12 | 382.9 | 6.87 | 249.6 | | | 13.4 |
| Total kg | 1140.4 | 24.71 | 167.72 | 477.3 | 51.77 | 249.6 | | | |
| Distributions: | | | | | | | | | |
| Matte % | 29.16 | 91.50 | 97.54 | 19.78 | 76.36 | | | | |
| Slag % | 70.84 | 8.50 | 2.46 | 80.22 | 11.68 | | | | |

TABLE 5

Reduction of Co- and Ni-bearing-Cu converter slag and sulphidization of resulting matte with Cu-concentrate

| | Amount kg | Co kg | Ni kg | Cu kg | Fe kg | S kg | SiO$_2$ kg | Fe$_3$O$_4$ kg |
|---|---|---|---|---|---|---|---|---|
| In: | | | | | | | | |
| Converter slag % | | 0.62 | 0.76 | 4.75 | 47.8 | 0.92 | 28.5 | 23.0 |
| Converter slag kg | 1000 | 6.2 | 7.6 | 47.5 | 478.0 | 9.2 | 285.0 | 230.0 |
| Cu-concentrate % | | 0.23 | 0.60 | 26.0 | 30.6 | 28.4 | 7.8 | |
| Cu-concentrate kg | 150 | 0.35 | 0.90 | 39.0 | 45.9 | 42.6 | 11.7 | |
| Coke kg | 50 | | | | | | | |
| Total kg | 1200 | 6.55 | 8.50 | 86.5 | 523.9 | 53.8 | 296.7 | |
| Out: | | | | | | | | |
| Matte % | | 2.79 | 4.13 | 43.6 | 32.0 | 15.3 | | |
| Matte kg | 187.6 | 5.23 | 7.75 | 81.8 | 60.0 | 28.7 | | |
| Slag % | | 0.14 | 0.08 | 0.49 | 49.0 | 1.0 | 31.3 | 2.85 |
| Slag kg | 946.5 | 1.33 | 0.76 | 4.64 | 463.8 | 9.5 | 296.7 | 27.0 |
| Total kg | 1134.1 | 6.56 | 8.51 | 86.44 | 523.8 | 38.2 | 296.3 | |
| Distributions: | | | | | | | | |
| Matte % | 16.54 | 79.73 | 91.07 | 94.63 | 11.45 | 53.3 | | |

TABLE 5-continued

| | Reduction of Co- and Ni-bearing-Cu converter slag and sulphidization of resulting matte with Cu-concentrate | | | | | | | |
|---|---|---|---|---|---|---|---|---|
| | Amount kg | Co kg | Ni kg | Cu kg | Fe kg | S kg | SiO$_2$ kg | Fe$_3$O$_4$ kg |
| Slag % | 83.46 | 20.27 | 8.93 | 5.37 | 88.55 | 17.7 | | |

TABLE 5a

| Magnetic separation of the slowly cooled sulphide matte created in Example 4 | | | | | | |
|---|---|---|---|---|---|---|
| | Amount kg | Co %, kg | Ni %, kg | Cu %, kg | Fe %, kg | S %, kg |
| In: | | | | | | |
| Ground matte % | | 2.79 | 4.13 | 43.6 | 32.0 | 15.3 |
| Ground matte kg | 187.6 | 5.23 | 7.75 | 81.8 | 60.0 | 28.7 |
| Out: | | | | | | |
| Magnetic fraction % | | 8.23 | 12.4 | 14.5 | 51.6 | 9.7 |
| Magnetic fraction kg | 60.64 | 4.99 | 7.52 | 8.8 | 31.3 | 5.9 |
| Non-magnetic fraction % | | 0.19 | 0.18 | 57.5 | 22.6 | 18.0 |
| Non-magnetic fraction kg | 126.96 | 0.24 | 0.23 | 73.0 | 28.7 | 22.9 |
| Total kg | 187.6 | 5.23 | 7.75 | 81.8 | 60.0 | 28.8 |
| Distributions: | | | | | | |
| Magnetic fraction % | 32.32 | 95.41 | 97.03 | 10.76 | 52.17 | 20.49 |
| Non-magnetic fraction kg | 67.68 | 4.59 | 2.97 | 89.24 | 47.83 | 79.51 |

TABLE 6

| Reduction of Mo-bearing Cu smelter slag and sulphidization of resulting matte with Cu-matte | | | | | | | |
|---|---|---|---|---|---|---|---|
| | Amount kg | Mo %, kg | Cu %, kg | Fe %, kg | S %, kg | SiO$_2$ %, kg | Fe$_3$O$_4$ %, kg |
| In: | | | | | | | |
| Reverbatory furnace slag % | | 0.38 | 0.55 | 35.4 | 0.10 | 36.5 | 11.2 |
| Reverbatory furnace slag kg | 1000 | 3.80 | 5.50 | 354.0 | 1.00 | 365.0 | 112.0 |
| Reverbatory furnace matte % | | 0.10 | 46.8 | 24.3 | 24.1 | | |
| Reverbatory furnace matte kg | 200 | 0.20 | 93.6 | 48.6 | 48.2 | | |
| Coke kg | 50 | | | | | | |
| Total kg | 1250 | 4.00 | 99.1 | 402.6 | 49.2 | | |
| Out: | | | | | | | |
| Matte % | | 1.83 | 48.4 | 31.7 | 16.1 | | |
| Matte kg | 195.3 | 3.57 | 94.5 | 61.9 | 31.4 | | |
| Slag % | | 0.05 | 0.52 | 38.6 | 9.5 | 41.4 | 1.25 |
| Slag kg | 882.5 | 0.44 | 4.6 | 340.6 | 8.4 | 365.4 | 11.0 |
| Total kg | 1077.8 | 4.01 | 99.1 | 402.5 | 39.8 | | |
| Distributions: | | | | | | | |
| Matte % | | 18.12 | 89.03 | 95.36 | 15.38 | 63.82 | |
| Slag % | | 81.88 | 10.97 | 4.64 | 84.62 | 17.07 | |

TABLE 6a

| Magnetic separation of the slowly cooled sulphide matte created in Example 5 | | | | | |
|---|---|---|---|---|---|
| | Amount kg | Mo %, kg | Cu %, kg | Fe %, kg | S %, kg |
| In: | | | | | |
| Ground matte % | | 1.83 | 48.4 | 31.7 | 16.1 |
| Ground matte kg | 195.3 | 3.57 | 94.5 | 61.9 | 31.4 |
| Out: | | | | | |
| Magnetic fraction % | | 6.55 | 16.7 | 62.4 | 10.7 |
| Magnetic fraction kg | 47.78 | 3.13 | 8.0 | 29.8 | 5.1 |
| Non-magnetic fraction % | | 0.30 | 58.6 | 21.8 | 17.8 |
| Non-magnetic fraction kg | 147.52 | 0.44 | 86.4 | 32.1 | 26.3 |
| Total kg | 195.3 | 3.57 | 94.4 | 61.9 | 31.4 |
| Distributions: | | | | | |
| Magnetic fraction % | 24.46 | 87.68 | 88.47 | 48.14 | 16.24 |
| Non-magnetic fraction % | 75.54 | 12.32 | 11.53 | 51.86 | 83.76 |

What is claimed is:

1. A method for processing magnetite-containing slags produced in pyrometallurgical processes, which slags contain one or more of the valuable metals nickel, cobalt and molybdenum as well as magnetite, to separate the valuable metals nickel, cobalt and molybdenum therefrom, comprising:
   (a) lowering the magnetite content of the slag in a preliminary reduction stage by treating the slag under reducing conditions in a temperature range of about 1100°–1400° C., producing molten slag; then
   (b) further reducing the slag by sulphidization to produce a metallicized sulphide matte containing the valuable metals to be recovered by adding a sulphidizing material containing copper and/or iron to the molten slag; and then
   (c) allowing said matte to cool in a controlled manner within a temperature range of about 1000°–500° C., and then separating the valuable metals.

2. The method of claim 1 wherein the slag to be treated initially contains at least 10% magnetite by weight, and including using coke to carry out said preliminary reduction state to lower the magnetite content of the slag to less than 10% by weight.

3. The method of claim 1 or 2 wherein the metallicized matte has a sulphur content maintained between 6.5% and 23% by weight for creating a balance between magnetic and non-magnetic phases.

4. The method of claim 1 wherein copper is present in said slag or is added thereto and in which most of the copper goes into the matte.

* * * * *

UNITED STATES PATENT AND TRADEMARK OFFICE
CERTIFICATE OF CORRECTION

PATENT NO. : 4,717,419
DATED : January 5, 1988
INVENTOR(S) : Juho K. Makinen et al It is certified that error appears in the above-identified patent and that said Letters Patent is hereby corrected as shown below:

Column 7, line 21, "$L_{Co}Fe-$"

line 22, "$Cu=80$" should be on one line and read:

-- $L_{Co}Fe-Cu=80$ --.

Signed and Sealed this

Seventh Day of June, 1988

Attest:

DONALD J. QUIGG

Attesting Officer

Commissioner of Patents and Trademarks